April 8, 1924.

J. L. WHEELER 1,489,376

RESETTING MECHANISM FOR MEASURING MACHINES

Filed July 7, 1921　　　2 Sheets-Sheet 1

Inventor:
John L. Wheeler.
By Elliott Thurman
Attorneys.

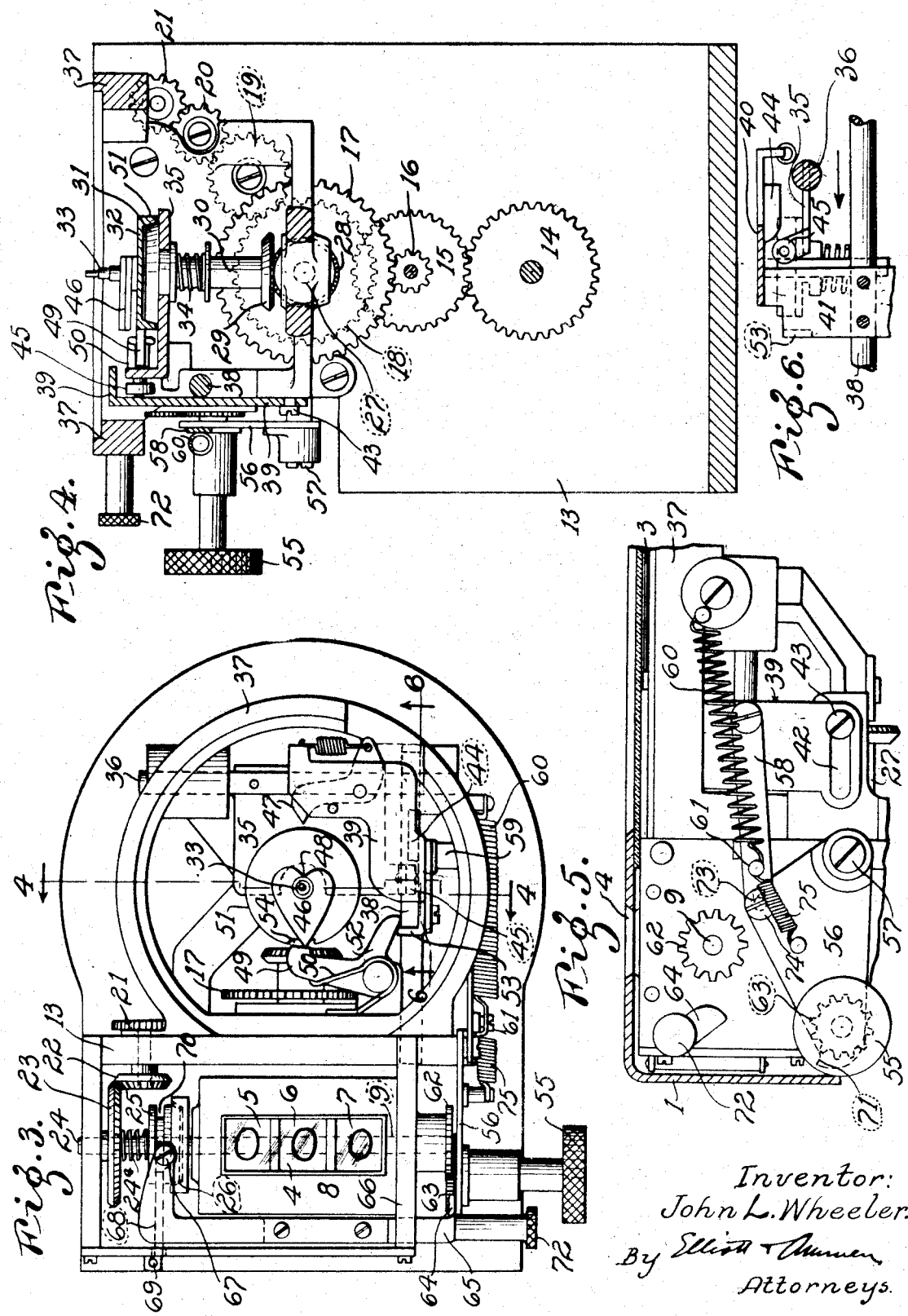

Patented Apr. 8, 1924.

1,489,376

UNITED STATES PATENT OFFICE.

JOHN L. WHEELER, OF ST. LOUIS, MISSOURI, ASSIGNOR TO THE MEASUREGRAPH COMPANY, OF ST. LOUIS, MISSOURI, A CORPORATION OF DELAWARE.

RESETTING MECHANISM FOR MEASURING MACHINES.

Application filed July 7, 1921. Serial No. 482,980.

*To all whom it may concern:*

Be it known that I, JOHN L. WHEELER, a citizen of the United States, residing in the city of St. Louis and State of Missouri, have invented new and useful Improvements in Resetting Mechanism for Measuring Machines, of which the following is a specification.

This invention relates to measuring machines and is expected to be especially useful when applied to a type of measuring machine which includes an indicator for measuring short lengths or fractions of the unit of measure and a totalizer for indicating the complete total of the measuring movement or movements. The type of machine illustrated presents an indicator which merely indicates fractions of a yard, and a totalizer which is capable of indicating a measurement up to 999 yards. Machines of this type are most useful in taking inventories of stocks of ribbon or fabric. The general object of the present invention is to provide simple means for effecting the resetting of the totalizer and the indicator to zero after measuring.

Further objects of the invention will appear hereinafter.

The invention consists in the novel features, and in the general combination of parts to be particularly described hereinafter, all of which contribute to produce a simple and efficient resetting mechanism for measuring machines. A preferred embodiment of my invention will be particularly described in the following specification, while the broad scope of my invention will be pointed out in the appended claims.

This invention is regarded as an improvement over the device illustrated in the application of Douglas Turner, Ser. No. 409,834, for fabric measuring and cost computing machines.

In the drawing,

Figure 3 is a plan of the machine with the casing removed;

Figure 4 is a cross section taken about on the line 4—4 of Figure 3;

Figure 5 is a view showing some of the parts illustrated in Figure 2, but representing them in another position; and Figure 6 is a vertical cross section taken about on the line 6—6 of Figure 3.

Figure 1:
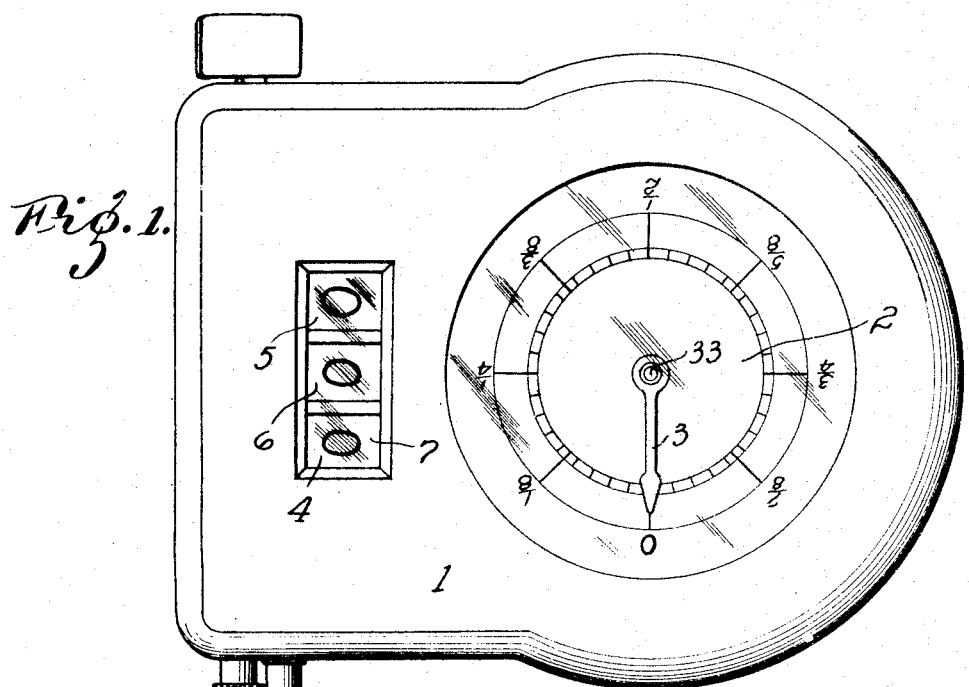
Figure 1 is a plan of the machine embodying my invention.

The machine comprises a casing 1 in the upper portion of which there is provided an indicator for indicating relatively short measured lengths. This indicator includes a dial 2 and a pointer 3 co-operating with the dial. In the present instance this dial is divided into fractions of the unit of measure, that is to say, fractions of a yard. Opposite to the dial a window 4 is provided in the upper side of the casing through which number wheels 5, 6, and 7 of a totalizer 8 are visible. (See Figures 1 and 3.) These number wheels are mounted upon a shaft 9.

Figure 2:
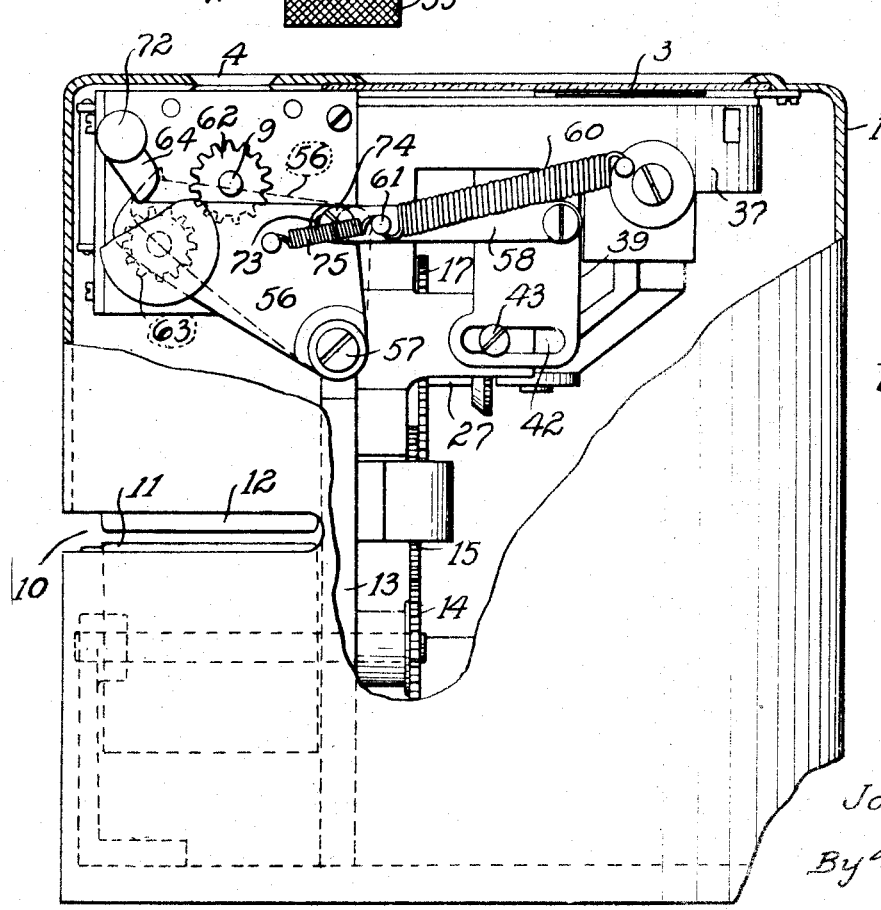
Figure 2 is a side elevation of the machine shown in Figure 1, with certain parts broken away and shown in cross section so as to disclose the mechanism of the instrument in side elevation.

In operating the machine the fabric or ribbon to be measured is introduced into a gap or throat 10 (see Fig. 2) so that it comes between the faces of a measuring roller 11 and a presser roller 12. In Figure 2 the presser roller is illustrated in a raised position but when the measuring movement is taking place it presses the fabric against the measuring roller.

The measuring roller is rotatably supported in a vertical frame plate 13. Any suitable driving means may be provided for driving the indicator pointer 3 and the number wheels of the totalizer 8, from the measuring roller. As illustrated the shaft of the measuring roller 11 carries a gear wheel 14 (see Fig. 4) which meshes with a gear wheel 15 disposed above it, the latter gear wheel being rigid with a pinion 16 which drives a large gear wheel 17. The gear wheel 17 is rigid with a pinion 18 which drives two idlers 19, 20, the latter of which meshes with a gear wheel 21 on the shaft of a bevel pinion 22 meshing with a bevel gear 23 on a clutch shaft 24. This clutch shaft carries a clutch member 25 co-operating with another clutch member 26 which is attached to the shaft 9 of the totalizer. Evidently when the clutch composed of the clutch members 25 and 26 is closed, the movement of the measuring roller will be imparted to the number wheels of the totalizer.

In order to drive the indicator pointer 3 the gear wheels 17 and 18 are provided with a shaft 27 (see Fig. 4) and this shaft carries a bevel gear 28 which meshes with a bevel gear 29 on a vertical shaft 30. (See Fig. 4.) This vertical shaft carries a clutch member 31 co-operating with a clutch member 32 the spindle 33 whereof is rotatably mounted in the center of the dial 2.

The clutch composed of the clutch members 31 and 32 is normally held closed by a coil spring 34 which forces the clutch member 31 up against the clutch member 32. However, the clutch may be opened through the agency of a rocking plate 35, one edge of which is secured in a rock shaft 36 mounted to rock in the upper frame 37 of the machine. This clutch is adapted to be opened through the operation of a horizontal shift bar 38 which is mounted to slide longitudinally in the upper frame 37 of the machine. This bar carries a rigid saddle plate 39 which has a horizontal extension 40 and a vertical extension 41. The middle portion of the vertical extension 41 is attached to the bar 38 and the lower portion is provided with a horizontal slot 42 guided on a screw 43 secured in a part of the frame 37. On the under side of the horizontal extension 40 the plate 39 is provided with a cam 44, and when the bar 38 is shifted in the direction indicated by the arrow in Figure 6 this cam 44 engages a roller 45 which is carried by the edge of the plate 35, the action of the cam being to depress the roller and thereby rock the plate 35 downwardly on the axis of the rock shaft 36; this opens the clutch 31, 32. The same movement of the shift bar 38 operates to rotate the spindle 33 of the pointer. For this purpose the spindle is provided with a heart-shaped cam 46 which may be formed of two superposed plates. (See Fig. 4.) The under side of the plate 39 is provided with a spring-pressed dog 47 (see Fig. 3) the point of which will engage the cam 46 and will rotate the cam until the point of the dog 47 finally comes to rest in the notch 48 of the cam. The pointer 3 will then be in its zero position.

In order to facilitate the stopping of the pointer 3 exactly in the zero position this machine is provided with a detent pawl 49 (see Fig. 3) which is provided with a spring 50 which tends to press it against the circumferential face 51 of the clutch member 32. This pawl 49 has a tail 52 which in the normal position of the bar 38 is engaged by a toe 53 on the plate 39, and this toe operates to hold the detent pawl 49 away from the face of the clutch member. However, when the bar 38 is shifted toward the left, as viewed in Figures 3 and 6, the toe 53 is out of the way of the tail 52 and the spring 50, therefore, will hold the pawl 49 against the face 51 of the clutch member 32. As soon as the pointer or hand 3 arrives at the zero position the end of the detent pawl 49 then drops into a notch 54 in the face of the cluch member and positively stops the pointer in this position.

I shall now describe the resetting mechanism which operates to shift the bar 38 to open the clutch 31, 32, and reset the pointer 3 to zero; this same mechanism also operates to open the clutch 25, 26 and effect the return of the number wheels 5, 6 and 7 to their zero position. This mechanism includes a resetting head or thumb head 55 which is movably mounted on a carrier and is provided with means for effecting a connection to the shaft 9 of the totalizer to rotate it in the resetting movement. However, this resetting head is normally held a short distance away so that this connection normally is open. I provide a clutch shifter for opening the clutch 25, 26, and when this clutch shifter is operated the connection is effected from the thumb head 55 to the shaft 9. The rotation of the thumb head then resets the totalizer 8 to zero. After this has been effected the carrier which supports the thumb head is actuated by pressing laterally on the resetting head and this lateral movement effects the shifting of the bar 38 which returns the indicator to zero. A peculiar relation of the clutch shifter and the carrier enables the carrier to hold the clutch 25, 26, open until the resetting movement of the totalizer is completed, and until the initiation of the movement of the carrier which effects the movement of the bar 38. The carrier referred to above is a lever in the form of a triangular plate 56 (see Fig. 5) and this plate is pivotally mounted on the frame of the machine at 57. A link 58 connects this plate by means of a post 59 with the saddle plate 39. A large coil spring 60 connects a pin 61 on this link with a portion of the frame 37 and tends to pull the lever 56 in a direction to effect a connection between the thumb head 55 and the shaft 9. The connection between the thumb head and the shaft 9 is effected through the meshing of a gear 62 carried rigidly on the shaft 9 and a pinion 63 rigid with the thumb head, it being understood that the thumb head is rotatably mounted in the lever 56. Contact between the pinion 63 and the gear 62 is prevented when the machine is measuring, through the agency of a stop 64 which projects laterally from a clutch shifter 65. This clutch shifter is a flat bar guided through a frame plate 66 (see Fig. 3), near the gear 62, but its outer end is pivotally attached by a screw 67 to a clutch plate 68 pivotally supported at 69 and which engages a circumferential groove 70 in the clutch member 25. The end of the lever 56 is formed with a toe or shoulder 71 which engages the stop. With this construction it is evident that if the thumb head 72 and the end of the clutch shifter 65 is shoved inwardly, the clutch shifter opens the clutch. Furthermore, this movement will bring the stop 64 out of alignment with the edge of the lever 56; this will release the lever 56 and the spring 60 will then pull it up and bring the pinion 63 into mesh with the gear 62. This will correspond to the dotted outline of the lever 56 illustrated in Figure 2, (and see Fig. 3).

In order to bring the pinion against the gear with a yielding movement I provide a lost motion connection between the link 58 and the lever 56 consisting of a slot 73 through which a pin or screw 74 passes. This permits a slight play or yielding of the pinion 63 in case it does not mesh nicely with the gear 62. However, a spring 75 connects the pin 61 aforesaid with the side of the lever 56 and, of course, by reason of the slot 73 the gears 63 and 62 are really pulled together by a tension exerted in the spring 75.

Now it is evident that when the lever 56 is shifted by the spring 60 so as to move it up into the position indicated in dotted lines in Figure 2, its end will project across in front of the stop 64 and will prevent the stop 64 from moving out again. Hence this will hold the clutch open. In this position of the lever 56 the operator of the machine then rotates the resetting head 55 and this movement is imparted to the gears 62 and 63 and to shaft 9, and resets the counter wheels 5, 6 and 7 to zero. When the operator observes the three zeros on the number wheels appearing at the window 4 he then shoves down on the resetting head 55 and this gives a pull to the link 58 which effects a shifting movement of the bar 38 which has already been described and which effects the return of the pointer 3 to zero. Of course, the initiation of the hand actuated swinging movement of the lever 56 which has just been described removes the end of the lever from the path of the stop 64 and this permits the clutch spring 24ᵃ to close the clutch.

I shall now briefly describe the general mode of operation of the machine.

The ribbon or other fabric to be measured is pulled through the gap 10 between the rollers 11 and 12 which would then be in contact with each other. This rotates the measuring roller 11 and its movement is imparted through the gear train 14, 15, etc. to the gear 21 which operates through the bevel gears 22 and 23 and the clutch 25, 26, to drive the number wheels of the totalizer. Through the shaft 27 (see Fig. 4) and the bevel gears 28 and 29 the vertical shaft 30 is driven and this shaft through the clutch 31, 32, drives the spindle 33 carrying the pointer 3.

After the measuring movement and when it is desired to reset the indicating pointer 3 and the totalizer to zero, the operator simply shoves in on the thumb head 72. This opens the clutch 25, 26, and also permits the spring-actuated shifting movement of the lever 56, thereby bringing the pinion 63 into mesh with the gear 62. At the same time, the end of the lever 56 moves across the face of the stop 64 and holds the clutch 25, 26, open. The operator then rotates the resetting head 55 until the number wheels of the totalizer all indicate zero. The operator then swings the lever 56 down by pressing downwardly on the resetting head and this effects the return of the pointer 3 to zero. When the operator releases the lever 56 it is returned again to its normal position, shown in full lines in Figure 2, at which time the shoulder 71 of the lever is engaged by the stop 64 which holds the gears 62 and 63 out of mesh.

It is understood that the embodiment of the invention described herein is only one of the many embodiments my invention may take and I do not wish to be limited in the practice of my invention, nor in my claims, to the particular embodiment set forth.

What I claim is:

1. In a measuring machine indicating device having an indicator and a totalizer, the totalizer having a shaft driven by a clutch, a resetting head having means for effecting a connection to the totalizer shaft to reset the same to zero, a movably supported carrier supporting the resetting head, a clutch-shifter for opening the clutch, having means for normally engaging the carrier to prevent the resetting head from effecting the said connection to the totalizer shaft, and operating automatically in its clutch-opening movement to release the resetting head and thereby permit the resetting head to be connected to the totalizer shaft to enable the same to be reset to zero by rotation of the resetting head, and means for resetting the said indicator to zero, actuated by a movement of the carrier after the totalizer has been reset to zero.

2. In a measuring machine indicating device having an indicator and a totalizer, the totalizer having a shaft driven by a clutch, a resetting head having means for effecting a connection to the totalizer shaft to reset the same to zero, a movably supported carrier supporting the resetting head, a clutch-shifter for opening the clutch, having means for normally engaging the carrier to prevent the resetting head from effecting the said connection to the totalizer shaft, and operating automatically in its clutch-opening movement to release the resetting head and thereby permit the resetting head to be connected to the totalizer shaft to enable the same to be reset to zero by rotation of the resetting head, means for resetting the said indicator to zero, actuated by a movement of the carrier after the totalizer has been reset to zero, and automatic means for closing the clutch when the carrier is moved to return the indicator to zero.

3. In a measuring machine indicating device having an indicator and a totalizer, the totalizer having a shaft driven by a clutch, a resetting head having means for effecting a connection to the totalizer shaft to reset the same to zero, a lever constituting a carrier for the resetting head, a clutch-shifter for opening the clutch having means for normally engaging the lever to prevent the resetting head from effecting the said connection to the totalizer shaft, and operating automatically in its clutch-opening movement to release the resetting head and thereby permit the same to be connected to the totalizer shaft to enable the totalizer to be reset to zero by rotating the resetting head, and means for resetting the said indicator to zero, actuated by a movement of the lever after the totalizer has been reset to zero.

4. In a measuring machine indicating device having an indicator and a totalizer, the totalizer having a shaft driven by a clutch, a gear wheel rigid with the totalizer shaft, a resetting head having a pinion to mesh with the gear wheel for resetting the totalizer to zero, a lever carrying the resetting head, a spring connected with the lever and tending to move the same in a direction to bring the pinion into engagement with the gear wheel, a clutch-shifter for opening the clutch, having means for normally engaging the lever to prevent the pinion from meshing with the gear wheel, and operating automatically in its clutch-opening movement to release the lever and permit the pinion to engage the gear wheel and thereby enable the totalizer to be reset to zero by rotating the resetting head, and means for resetting the said indicator to zero actuated by a movement of the lever after the totalizer has been reset to zero.

5. In a measuring machine indicating device having an indicator and a totalizer, the totalizer having a shaft driven by a clutch, a gear wheel rigid with the totalizer shaft, a resetting head having a pinion to mesh with the gear wheel for resetting the totalizer to zero, a lever carrying the resetting head, a spring connected with the lever and tending to move the same in a direction to bring the pinion into engagement with the gear wheel, a clutch-shifter for opening the clutch, having a stop normally engaging the lever to prevent the pinion from meshing with the gear wheel and operating to move out of engagement with the lever during the clutch-opening movement, thereby releasing the lever, and permitting its spring to shift it and bring the pinion into engagement with the gear wheel to enable the totalizer to be reset to zero by rotating the resetting head, and means for resetting the said indicator to zero actuated by a hand-actuated swinging movement of the lever after the totalizer has been reset to zero.

6. In a measuring machine indicating device having an indicator and a totalizer, the totalizer having a shaft driven by a clutch, a gear wheel rigid with the totalizer shaft, a resetting head having a pinion to mesh with the gear wheel for resetting the totalizer to zero, a lever carrying the resetting head, a spring connected with the lever and tending to move the same in a direction to bring the pinion into engagement with the gear wheel, a clutch-shifter for opening the clutch, having a stop normally engaging the lever to prevent the pinion from meshing with the gear wheel and operating to move out of engagement with the lever during the clutch-opening movement, thereby releasing the lever, and permitting its spring to shift it and bring the pinion into engagement with the gear wheel to enable the totalizer to be reset to zero by rotating the resetting head, means for resetting the said indicator to zero actuated by a hand-actuated swinging movement of the lever after the totalizer has been reset to zero, a clutch-spring tending to close the clutch, the clutch-opening movement of the clutch-shifter co-operating with the spring actuated shifting movement of the lever, to bring the stop into engagement with the side of the lever and thereby enable the lever to hold the clutch open until the swinging movement of the lever occurs.

7. In a measuring machine indicating device having an indicator and a totalizer, the totalizer having a shaft driven by a clutch, means for opening the clutch, a gear carried by the totalizer shaft, a resetting head carrying a pinion, a lever carrying the resetting head, and capable of assuming a position which will maintain the pinion in mesh with the gear to enable the resetting head to reset the totalizer to zero, and means for resetting the said indicator to zero actuated by a movement of the lever after the totalizer has been reset.

8. In a measuring machine indicating device having an indicator and a totalizer, the totalizer having a shaft driven by a clutch, means for opening the clutch, a gear carried by the totalizer shaft, a resetting head carrying a pinion, a lever carrying the resetting head, a spring tending to pull the lever toward the said gear to enable the pinion to mesh with the gear for resetting the totalizer to zero, and means for resetting the said indicator to zero actuated by a movement of the lever after the totalizer has been reset.

In testimony whereof, I have hereunto set my hand.

JOHN L. WHEELER.